United States Patent
Derginer et al.

(10) Patent No.: US 11,794,865 B1
(45) Date of Patent: Oct. 24, 2023

(54) PROXIMITY SENSING SYSTEM AND METHOD FOR A MARINE VESSEL

(71) Applicant: Brunswick Corporation, Mettawa, IL (US)

(72) Inventors: Matthew E. Derginer, Butte des Mort, WI (US); Aaron J. Ward, Oshkosh, WI (US); Travis C. Malouf, Germantown, WI (US)

(73) Assignee: Brunswick Corporation, Mettawa, IL (US)

( * ) Notice: Subject to any disclaimer, the term of this patent is extended or adjusted under 35 U.S.C. 154(b) by 371 days.

(21) Appl. No.: 16/675,310

(22) Filed: Nov. 6, 2019

Related U.S. Application Data (60) Provisional application No. 62/770,506, filed on Nov. 21, 2018.

(51) Int. Cl.
  *B63B 49/00* (2006.01)
  *G01C 21/00* (2006.01)
  (Continued)

(52) U.S. Cl.
  CPC ............ *B63B 49/00* (2013.01); *G01C 21/005* (2013.01); *G01C 21/20* (2013.01); *B63H 2020/003* (2013.01); *G01C 21/203* (2013.01)

(58) Field of Classification Search
  CPC .... G01C 21/005; G01C 21/203; G01C 21/20; B23B 49/00; B63H 20/00; B63H 2020/003; G06K 9/00671; G06T 3/80
  (Continued)

(56) References Cited

U.S. PATENT DOCUMENTS

| 5,515,287 | A | 5/1996 | Hakoyama et al. |
| 6,234,100 | B1 | 5/2001 | Fadeley et al. |

(Continued)

FOREIGN PATENT DOCUMENTS

| CA | 2279165 | 1/2001 |
| CA | 2282064 | 1/2001 |

(Continued)

OTHER PUBLICATIONS

Gonzalez-Reolid et al. "An Autonomous Solar-Powered Marine Robotic Observatory for Permanent Monitoring of Large Areas of Shallow Water"; Sensors 2018, 18(10), 3497; (Received: Sep. 16, 2018 / Revised: Oct. 8, 2018 / Accepted: Oct. 13, 2018 / Published: Oct. 17, 2018) (Year: 2018).*

(Continued)

*Primary Examiner* — Cuong H Nguyen
(74) *Attorney, Agent, or Firm* — ANDRUS INTELLECTUAL PROPERTY LAW, LLP (57) ABSTRACT

A method of proximity sensing on a marine vessel includes storing at least one zone map, wherein the zone map divides an area surrounding the marine vessel into two or more zones. Proximity measurements measured by one or more proximity sensors on the marine vessel are received, and the proximity measurements are then divided into zone sets based on a location of each proximity measurement with respect to the zone map. A closest proximity measurement in each zone set is then identified and a zone-filtered dataset is generated. The zone-filtered dataset contains only the closest proximity measurement from each zone set.

20 Claims, 6 Drawing Sheets

(51) Int. Cl.
  *G01C 21/20* (2006.01)
  *B63H 20/00* (2006.01)
(58) Field of Classification Search
  USPC .......................................................... 701/21
  See application file for complete search history.

(56) References Cited

U.S. PATENT DOCUMENTS

| | | | |
|---|---|---|---|
| 6,273,771 B1 | 8/2001 | Buckley et al. | |
| 7,267,068 B2 | 11/2007 | Bradley et al. | |
| 7,725,253 B2 | 5/2010 | Foxlin | |
| 8,195,381 B2 | 6/2012 | Arvidsson | |
| 8,622,778 B2 | 1/2014 | Tyers et al. | |
| 9,039,469 B1 | 5/2015 | Calamia et al. | |
| 9,183,711 B2 | 11/2015 | Fiorini et al. | |
| 9,355,463 B1 | 5/2016 | Arambel et al. | |
| 9,615,006 B2 | 4/2017 | Terre et al. | |
| 9,650,119 B2 | 5/2017 | Morikami et al. | |
| 9,669,851 B2* | 6/2017 | Cooper | B61L 3/10 |
| 9,729,802 B2 | 8/2017 | Frank et al. | |
| 9,734,583 B2 | 8/2017 | Walker et al. | |
| 9,778,657 B2 | 10/2017 | Tyers | |
| 9,878,769 B2 | 1/2018 | Kinoshita et al. | |
| 9,996,083 B2 | 1/2018 | Vojak | |
| 9,908,605 B2 | 3/2018 | Hayashi et al. | |
| 9,927,520 B1 | 3/2018 | Ward et al. | |
| 9,988,134 B1 | 6/2018 | Gable et al. | |
| 10,037,701 B2 | 7/2018 | Harnett | |
| 10,048,690 B1 | 8/2018 | Hilbert et al. | |
| 10,055,648 B1 | 8/2018 | Grigsby et al. | |
| 10,106,238 B2 | 10/2018 | Sidki et al. | |
| 10,126,748 B2 | 11/2018 | Akuzawa et al. | |
| 10,191,153 B2 | 1/2019 | Gatland | |
| 10,191,490 B2 | 1/2019 | Akuzawa et al. | |
| 10,431,099 B2 | 1/2019 | Stewart et al. | |
| 10,259,555 B2* | 4/2019 | Ward | B63H 21/213 |
| 10,272,977 B2* | 4/2019 | Hashizume | G08B 25/14 |
| 10,281,917 B2 | 5/2019 | Tyers | |
| 10,338,800 B2* | 7/2019 | Rivers | G06F 3/017 |
| 10,429,845 B2 | 10/2019 | Arbuckle et al. | |
| 10,444,349 B2 | 10/2019 | Gatland | |
| 10,507,899 B2 | 12/2019 | Imamura et al. | |
| 10,681,199 B2* | 6/2020 | Jung | H04M 1/72415 |
| 10,746,552 B2* | 8/2020 | Hashizume | G01C 21/20 |
| 11,417,219 B2* | 8/2022 | Suzuki | G01C 21/203 |
| 11,443,637 B2* | 9/2022 | Malouf | G01S 13/42 |
| 2003/0137445 A1 | 7/2003 | Rees et al. | |
| 2005/0075016 A1 | 4/2005 | Bertetti et al. | |
| 2006/0058929 A1 | 3/2006 | Fossen et al. | |
| 2007/0089660 A1 | 4/2007 | Bradley et al. | |
| 2011/0153125 A1 | 6/2011 | Arbuckle et al. | |
| 2011/0172858 A1 | 7/2011 | Gustin et al. | |
| 2014/0316657 A1 | 10/2014 | Johnson et al. | |
| 2015/0009325 A1 | 1/2015 | Kardashov | |
| 2015/0032305 A1 | 1/2015 | Lindeborg | |
| 2015/0089427 A1 | 3/2015 | Akuzawa | |
| 2015/0134146 A1 | 5/2015 | Pack et al. | |
| 2015/0172545 A1 | 6/2015 | Szabo et al. | |
| 2015/0276923 A1 | 10/2015 | Song et al. | |
| 2015/0288891 A1 | 10/2015 | Johansson et al. | |
| 2015/0294660 A1 | 10/2015 | Stokes et al. | |
| 2015/0375837 A1 | 12/2015 | Johnson et al. | |
| 2015/0378361 A1 | 12/2015 | Walker et al. | |
| 2016/0041039 A1 | 2/2016 | Olsson | |
| 2016/0069681 A1 | 3/2016 | Johnson et al. | |
| 2016/0070265 A1 | 3/2016 | Liu et al. | |
| 2016/0125739 A1 | 5/2016 | Stewart et al. | |
| 2016/0162145 A1 | 6/2016 | Rivers et al. | |
| 2016/0187140 A1 | 6/2016 | Clarke et al. | |
| 2016/0196653 A1 | 7/2016 | Grant et al. | |
| 2016/0214534 A1 | 7/2016 | Richards et al. | |
| 2016/0334794 A1 | 7/2016 | Johnson et al. | |
| 2016/0370187 A1 | 12/2016 | Gatland et al. | |
| 2017/0052029 A1* | 2/2017 | Ninomiya | G01C 21/203 |
| 2017/0059705 A1 | 3/2017 | Stokes et al. | |
| 2017/0064238 A1 | 3/2017 | Kardashov | |
| 2017/0090021 A1 | 3/2017 | Sayer et al. | |
| 2017/0146642 A1 | 5/2017 | Stokes et al. | |
| 2017/0167871 A1 | 6/2017 | Johnson et al. | |
| 2017/0168159 A1 | 6/2017 | Gatland | |
| 2017/0176586 A1 | 6/2017 | Johnson et al. | |
| 2017/0184414 A1 | 6/2017 | Johsnon et al. | |
| 2017/0205829 A1 | 7/2017 | Tyers | |
| 2017/0227639 A1 | 8/2017 | Stokes et al. | |
| 2017/0243360 A1 | 8/2017 | Schulte | |
| 2017/0253314 A1 | 9/2017 | Ward | |
| 2017/0277189 A1 | 9/2017 | Johnson et al. | |
| 2017/0285134 A1 | 10/2017 | Stokes et al. | |
| 2017/0300056 A1 | 10/2017 | Johnson et al. | |
| 2017/0365175 A1 | 12/2017 | Harnett | |
| 2017/0371348 A1 | 12/2017 | Mou | |
| 2018/0023954 A1 | 1/2018 | Rivers | |
| 2018/0050772 A1 | 2/2018 | Koyano et al. | |
| 2018/0057132 A1* | 3/2018 | Ward | B63H 25/42 |
| 2018/0081054 A1 | 3/2018 | Rudzinsky et al. | |
| 2018/0259338 A1 | 9/2018 | Stokes et al. | |
| 2018/0259339 A1 | 9/2018 | Johnson et al. | |
| 2018/0292529 A1 | 10/2018 | Hogasten | |
| 2019/0098212 A1 | 3/2019 | Shain et al. | |
| 2019/0137618 A1 | 5/2019 | Hawker | |
| 2019/0170521 A1* | 6/2019 | Elhoushi | G01C 21/34 |
| 2019/0251356 A1* | 8/2019 | Rivers | G06T 3/60 |
| 2019/0258258 A1 | 8/2019 | Tyers | |
| 2019/0283855 A1 | 9/2019 | Nilsson | |
| 2019/0299983 A1 | 10/2019 | Shalev-Shwartz et al. | |
| 2020/0035106 A1* | 1/2020 | Suzuki | G01C 21/20 |

FOREIGN PATENT DOCUMENTS

| | | |
|---|---|---|
| DE | 11 2013 004908 | 6/2015 |
| EP | 1 775 212 | 4/2007 |
| EP | 1873052 A2 | 1/2008 |
| EP | 3 182 155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| WO | 9305406 | 3/1993 |
| WO | 2006040785 A1 | 4/2006 |
| WO | 2006 062416 | 6/2006 |
| WO | 2008 066422 | 6/2008 |
| WO | 2012010818 | 1/2012 |
| WO | 2017 095235 | 6/2017 |
| WO | 2017167905 | 10/2017 |
| WO | 2017168234 | 10/2017 |
| WO | 2017168234 A1 | 10/2017 |
| WO | 2017205829 | 11/2017 |
| WO | 2018162933 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2018232377 A1 | 12/2018 |
| WO | 2019011451 | 1/2019 |
| WO | 2019096401 | 5/2019 |
| WO | 2019126755 | 6/2019 |
| WO | 2019157400 | 8/2019 |
| WO | 2019201945 | 10/2019 |

OTHER PUBLICATIONS

Ziebinski A et al.; A Survey of ADAS Technologies for the Future Perspective of Sensor Fusion. International Conference on Computational Collective Intelligence; ICCCI 2016: Computational Collective Intelligence pp. 135-146. (Year: 2016).*

W. Xu et al., "Internet of vehicles in big data era," in IEEE/CAA Journal of Automatica Sinica, vol. 5, No. 1, pp. 19-35, Jan. 2018, doi: 10.1109/JAS.2017.7510736. (Year: 2018).*

(56) References Cited

OTHER PUBLICATIONS

An Autonomous Solar-Powered Marine Robotic Observatory for Permanent Monitoring of Large Areas of Shallow Water by I. González-Reolid et al.; Sensors 2018, 18(10), 3497; https://doi.org/10.3390/s18103497 (Year: 2018).*

S. Reed and V. E. Schmidt, "Providing Nautical Chart awareness to autonomous surface vessel operations," Oceans 2016 MTS/IEEE Monterey, 2016, pp. 1-8, doi: 10.1109/OCEANS.2016.7761472. (Year: 2016).*

González-Reolid, I., et al. "An autonomous solar-powered marine robotic observatory for permanent monitoring of large areas of shallow water." Sensors 18.10 (2018): 3497. (Year: 2018).*

Review of Collision Avoidance and Path Planning Methods for Ships Utilizing Radar Remote Sensing by Agnieszka Lazarowska; Remote Sens. 2021, 13(16), 3265; https://doi.org/10.3390/rs13163265 (Year: 2021.*

H. Lyu and Y. Yin, "Ship's trajectory planning for collision avoidance at sea based on modified artificial potential field," 2017 2nd International Conference on Robotics and Automation Engineering (ICRAE), 2017, pp. 351-357, doi: 10.1109/ICRAE.2017.8291409. (Year: 2017).*

V. Grinyak and Y. Ivanenko, "Decision Support for Marine Traffic Control based on Route Clustering," 2020 International Multi-Conference on Industrial Engineering and Modern Technologies (FarEastCon), Vladivostok, Russia, 2020, pp. 1-6, doi: 10.1109/FarEastCon50210.2020.9271386. (Year: 2020).*

John Bayless, Adaptive Control of Joystick Steering in Recreational Boals, Marquette University, Aug. 2017, https://epublications.marquette.edu/cgi/viewcontent.cgi?article=1439&context=theses_open.

* cited by examiner

PROXIMITY SENSING SYSTEM AND METHOD FOR A MARINE VESSEL

FIELD

The present disclosure generally relates to systems and methods for proximity sensing on a marine vessel, and more specifically to proximity sensing systems and methods that intelligently filter proximity measurement data to prioritize obstacles and provide a proximity sensing system for use in autonomous or semi-autonomous vessel control that can be performed on an embedded controller and/or using bandwidth-limited networks.

BACKGROUND

The following U.S. Patents are incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of proximity sensing on a marine vessel includes storing at least one zone map, wherein the zone map divides an area surrounding the marine vessel into two or more zones. Proximity measurements measured by one or more proximity sensors on the marine vessel are received, and the proximity measurements are then divided into zone sets based on a location of each proximity measurement with respect to the zone map. A closest proximity measurement in each zone set is then identified and a zone-filtered dataset is generated. The zone-filtered dataset contains only the closest proximity measurements in each zone set.

One embodiment of a proximity sensor system on a marine vessel includes one or more proximity sensors, wherein each proximity sensor is at a sensor location on the marine vessel and is configured to measure proximity of objects and generate proximity measurements accordingly.

The system further includes a memory storing at least one zone map, wherein the zone map divides an area surrounding the marine vessel into two or more zones. The system further includes a processor configured to receive proximity measurements measured by the one or more proximity sensors on the marine vessel, divide the proximity measurements into zone sets based on a location of each proximity measurement with respect to the zone map, and then identify a closest proximity measurement in each zone set. A zone-filtered dataset is then generated containing only the closest proximity measurement in each zone set.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
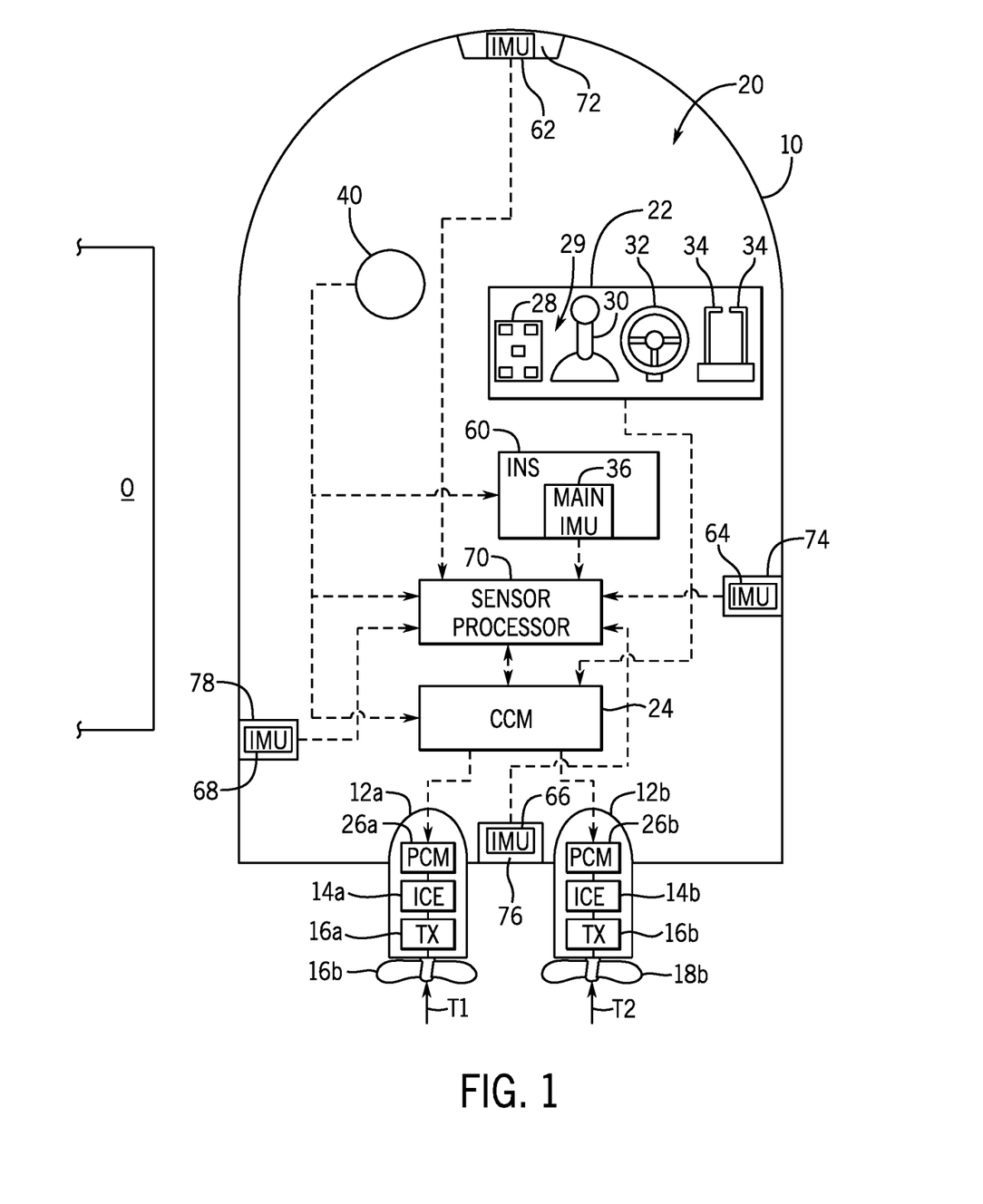
FIG. 1 is a schematic representation of an exemplary propulsion system on a marine vessel according to one embodiment of the present disclosure.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by a user to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the propulsion control system 20. The system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory 25a and a programmable processor 25b. As is conventional, each control module 24, 26a, 26b includes a processor communicatively connected to a storage system comprising a computer-readable medium that includes volatile or non-volatile memory upon which computer readable code and data is stored. The processor can access the computer readable code and, upon executing the code, carries out functions, such as the navigation control functions and/or the proximity sensing functions, as described in detail below.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide signals to the controller 24. The joystick 30 can be used to allow the operator of the vessel 10 to manually maneuver the vessel 10, such as to achieve lateral translation or rotation of the vessel 10.

The propulsion control system 20 also includes a proximity sensing system that includes one or more proximity sensors 72, 74, 76, and 78 and one or more sensor processors or controllers for processing the data generated by the proximity sensors. Although one proximity sensor is shown on each of the bow, stern, and port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. LIDARs or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more control modules, such as to the sensor processor 70 and/or the control module 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, LIDAR, ultrasonic, LEDDAR, or sonar sensors may instead be used. Camera sensors may be used, alone or in combination with any of the sensors mentioned above, in order to provide object proximity information to the control module 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, LIDARs, LEDDARs, ultrasonics, and cameras) to sense the shortest distance and the direction of the object with respect to the vessel 10. Alternatively, the sensor processor may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 are established as part of a calibration procedure for the proximity sensing system.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of navigation determined for the marine vessel 10, such as the COR or COG.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The inventors have recognized that sensing suites on autonomous vehicles produce large amounts of proximity measurement data, and that such large data amounts are impractical for implementing proximity sensor systems that run on an embedded controller and/or utilize bandwidth-limited networks, such as CAN buses. The inventors further recognize that previously-developed solutions in the autonomy field for filtering data provide insufficient or inappropriate data reduction for implementation within existing marine vessel control architectures. For example, the concept of an occupancy grid has been utilized in the autonomy field, which provides some degree of data reduction. However, occupancy grids still yield large amounts of data and require powerful computers and high-bandwidth networks to perform any useful calculations based on the resulting datasets.

In view of the above-described challenges and inadequacies with data processing systems for autonomous or semi-autonomous vehicle control, the inventors developed the disclosed method and system which are appropriate for and tailored to proximity sensing within a marine environment and implementation of proximity sensor systems within existing marine vessel control architectures and networks. As described in more detail below, the disclosed system is configured to reduce an arbitrarily large number of data points from any sensor configuration on a marine vessel 10 to n number of data points, where n is determined by the number of zones within a zone map implemented by the control system 20. The disclosed zone-based filtering scheme is agnostic to the type and number of proximity sensors 72-78 implemented in the control system 20. Moreover, the disclosed zone-based filtering system is scalable to the size and configuration of any marine vessel by scaling the zone size and/or shape (i.e. the defined area surrounding the marine vessel designated by the zone) and/or adjusting the number of zones. Moreover, the zone-based filtering scheme can be implemented using an existing map or occupancy grid that integrate proximity measurement data from multiple proximity sensors and sensor types, or can be implemented using the raw sensor data from each individual proximity sensor 72-28.

Figure 2:
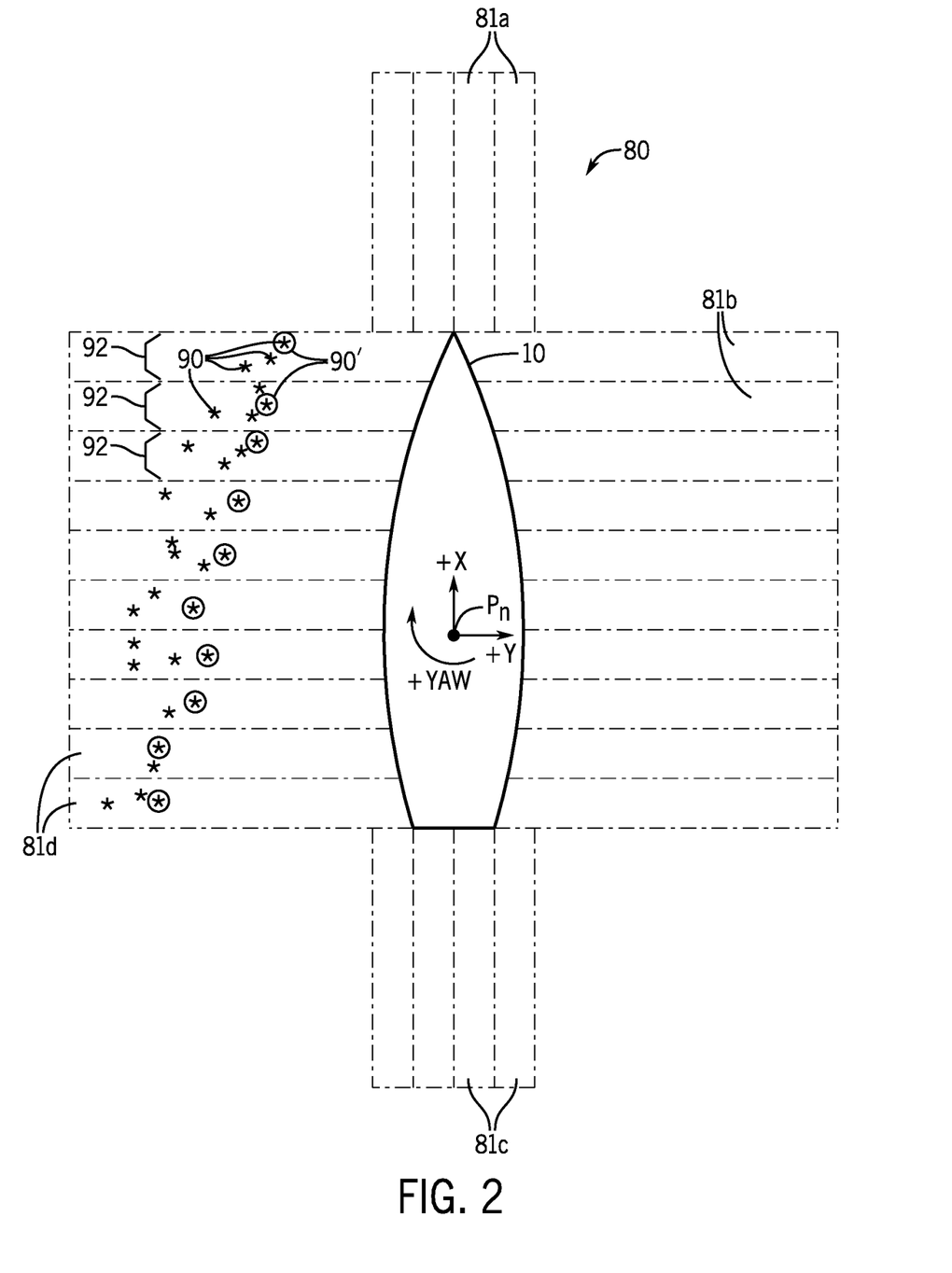
FIG. 2 is a schematic diagram of an exemplary zone map dividing an area surrounding the marine vessel into multiple zones to generate a zone-filtered dataset.
Figure 3:
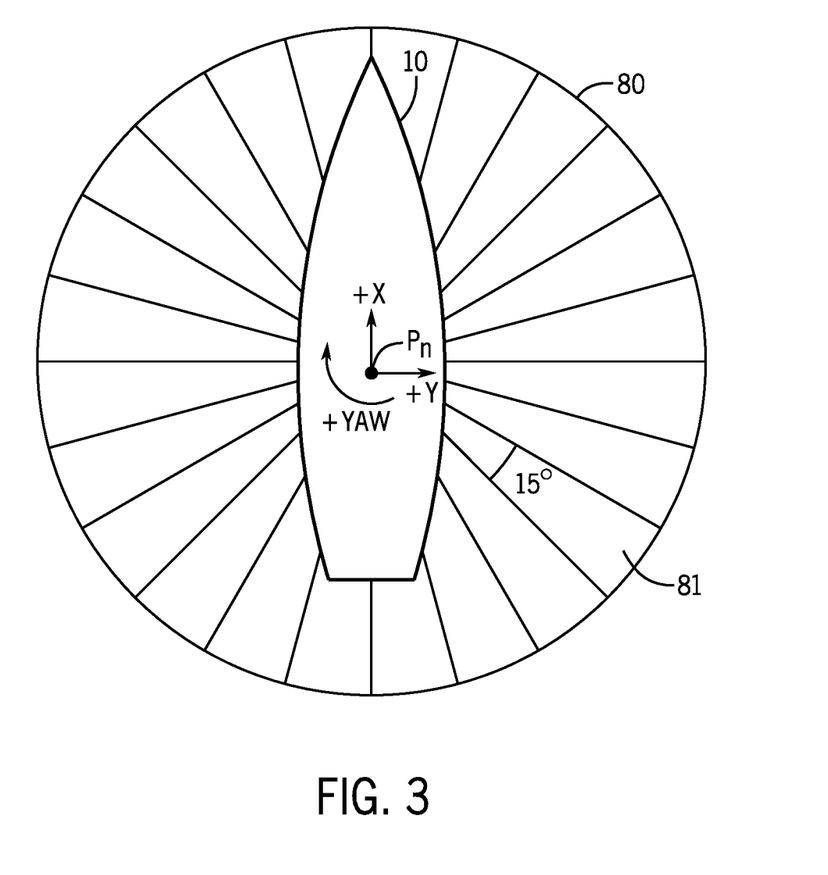
FIG. 3 depicts another exemplary embodiment of a zone map.
Figure 4:
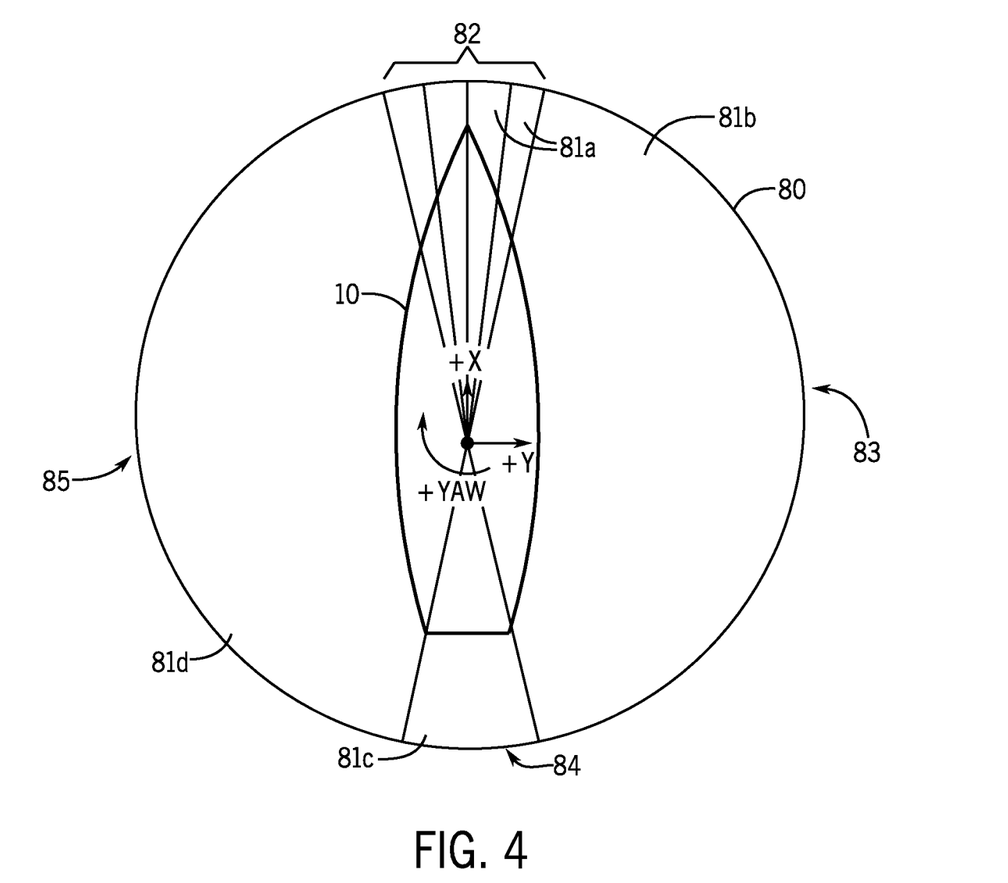
FIG. 4 depicts yet another exemplary embodiment of a zone map.

The proximity sensing method and system prioritize and filter proximity measurement data based on a zone map which divides the area surrounding the marine vessel into two or more zones. FIGS. 2-4 provide exemplary zone maps. The depicted zone maps are for purposes of example and explanation only and are not limiting. A person having ordinary skill in the relevant art will recognize in light of this disclosure that zone maps may include any number of zones and zone shape, and the map may define any shape with respect to the marine vessel 10. The data prioritization is completed by selecting the nearest proximity measurement in each zone. This concept is illustrated in FIG. 2, where the area surrounding the marine vessel 10 is divided into multiple zones 81 according to zone map 80. Proximity measurements 90 are then categorized into zone sets 92 based on the location of each proximity measurement 90 with respect to the zone map 80. Namely, the proximity measurement values 90 falling within the area defined by a particular zone 81 are categorized into a zone set 92.

Within each zone set 92 a closest proximity measurement 90' is identified. Thus, a closest proximity measurement 90' is identified for each zone 81 where at least one proximity measurement 90 is returned. A zone-filtered dataset is generated containing the identified closest proximity measurements 90'. Accordingly, the zone-filtered dataset has a number of proximity measurements that is less than or equal to the number of zones 81 in the zone map 80. In certain embodiments where no proximity measurement is present within a zone 81, the zone set 92 is null and no closest proximity measurement is provided for that zone set 92. In such an embodiment, the zone-filtered dataset may contain fewer data points than the number of zones 81. In other embodiments, the system may be configured to default to a maximum proximity measurement value as the closest proximity measurement in each zone set 92 when no actual measurement value is provided. In such an embodiment, the zone-filtered dataset always contains a number of closest proximity measurements 90' equal to the number of zones 81 in the zone map 80.

The proximity measurement data may contain proximity measurements 90 from multiple sensors installed at different locations on the marine vessel 10, such as proximity sensors 72-78 shown in FIG. 1. The proximity sensors 72-78 may be different sensor types, such as ultrasonic, radar, LIDAR, Leddar, cameras, etc. Each sensor type provides a different measurement resolution and field of view. Furthermore, each sensor (e.g. 72-78) is positioned at a different location on the marine vessel 10 and thus images a different section of the area surrounding the marine vessel 10. Therefore, the proximity measurements from each of the proximity sensors 72-78 may be translated to a common reference frame so that the data from the various proximity sensors 72-78 can be consistently interpreted with respect to the zone map 80. For example, each of the proximity measurements 90 may be translated to be presented with respect to a particular point on the marine vessel, such as the point of navigation $P_n$. The zone map 80 may also be defined with respect to the same point of navigation, and thus the zones 81 and the zone sets 92 are easily identified because the zone map 80 and all proximity measurements 90 are defined in a common reference frame. The point of navigation $P_n$ may be, for example, the COG or COR for the marine vessel 10.

The zone map 80 may be configured with any number of two or more zones 81, and the zones may be of any shape or organization around the marine vessel 10. In the example of FIG. 2, the zones are organized along the XY axis, and the area around the marine vessel 10 is divided into twenty eight equally-sized zones 81. Specifically, the zone map 80 is organized with four front zones 81a defining the area directly in front of the marine vessel 10, and four rear zones 81c defining the area behind the stern of the marine vessel 10. The area on either side of the marine vessel 10 is divided into ten zones each, with ten starboard-side zones 81b and 10 port-side zones 81d. In the example, proximity measurements 90 are depicted only on the port side of the marine vessel 10, which is for visual clarity and for purposes of example only and it will be understood that proximity measurement values 90 will depend on the objects O and environment surrounding the marine vessel. It will also be understood that each zone 81a-81d extends out further than depicted in the illustrations. Each zone 81 may extend the full distance of the longest measurement capabilities of the various proximity sensors 72-78. In other embodiments, the length of each zone 81 may be defined as less than the maximum distance measurement by the proximity sensors 72-78 so as to eliminate proximity measurements 90 beyond a predefined distance from the marine vessel 10.

The zone map 80 may be any size and shape with respect to the marine vessel 10. The zone map 80 may be symmetrical or asymmetrical with respect to the marine vessel 10, such as providing a wider and/or longer zone definition in the front of the marine vessel than in the rear of the marine vessel. Thereby, more proximity measurements 90 in the area in front of the marine vessel 10 will be identified, and more proximity measurements 90 behind the marine vessel will be filtered out. Such an arrangement may be particularly advantageous for a marine vessel operating in a forward heading where objects in front of the marine vessel 10 are of primary concern and objects behind the marine vessel 10 are typically not of any concern.

FIGS. 3 and 4 depict different zone maps 80. In both of these embodiments, the zone map 80 includes zones divided around a navigation reference point $P_n$. For example, the zones 81 may be defined in degrees or polar coordinates around the navigation reference point $P_n$. As described above, this may be the same reference point and/or defined in the same common reference frame as the proximity measurements 90. The zone map 80 may include a predefined number of zones 81 that are equally divided around the navigation point $P_n$, such as depicted in FIG. 3 where the zone map 80 includes 24 zones equally divided in increments of 15° around the reference point $P_n$. Alternatively, the zone map 80 may be selectively divided into zones 81, where a higher concentration of smaller zones is provided around certain areas of the marine vessel 10. In FIG. 4, the zone map 80 includes a higher concentration of smaller front zones 81a, where four front zones 81a are concentrated in a front region in front of the bow of the marine vessel 10. Only one zone is provided on each side of the marine vessel 10, and one zone at the rear. The starboard-side zone 81b and the port-side zone 81d each span the entire side of the marine vessel. Thus, all proximity measurements 90 that fall within each of the side zones 81b and 81d will be filtered out except for one closest proximity measurement 90' one each side of the marine vessel 10. The rear zone 81c encompasses the entire area behind the stern of the marine vessel 10, and thus only one closest proximity measurement 90' from behind the marine vessel 10 will be identified in the zone-filtered dataset. This zone map 80 shown in FIG. 4 may be especially useful for processing proximity measurement data when the marine vessel is traveling in the forward direction, where only objects directly in front of the marine vessel 10 are of high importance.

One or more zone maps 80 may be defined for a marine vessel 10, such as based on the vessel size and/or shape and the configuration of the propulsion system thereon. For example, for a marine vessel that offers joystick 30 steering control, a zone map 80 may be defined for use with joystick functionality. The joysticking zone map 80 may be different than the map defined for steering control via a steering wheel 32, for example. Additionally, each zone map 80 may be designed to account for the number and type of proximity sensors on the marine vessel 10. For example, where ultrasonic sensors are used, the relevant zones 81 may be defined to correspond with the field of view of the ultrasonic sensor, which only provides one proximity measurement within its field of view. Where the proximity sensor 72-78 is a camera, a single zone may be defined based on the camera field of view. Alternatively, the camera field of view may be divided into two or more zones 81. Where radar or LIDAR sensors are provided, for example, the respective sensor fields of view may be divided across multiple zones 81. It will be understood that two or more sensors may be providing proximity measurements that fall within a single defined zone 81. Also, different zone maps may be devised to utilized different sensor sets, such as based on the proximity sensing functionality most appropriate based on the vessel's speed, environment, etc.

In certain embodiments, multiple zone maps 80 may be defined for each marine vessel 10, and a set of zone maps may be stored in a controller where the zone-based filtering process is executed, such as the sensor processor 70. A zone map 80 from the set of zone maps may be identified, such as based on vessel operation and/or based on the proximity measurement data. For example, a particular zone map may be identified based on a speed and/or direction of travel of the marine vessel 10, such as to increase the concentration of zones in one or more regions 82-85 corresponding with the direction of travel of the marine vessel and/or to increase the concentration of zones in an area densely populated by objects.

In certain embodiments, the zone map 80 may be separated into one or more regions. In the example of FIG. 4, the zone map 80 is divided into four regions, including a front region 82, a starboard-side region 83, a rear region 84, and a port-side region 85. Each region 82-85 may be divided into one or more zones 81, such as according to the navigation needs of the control system 20. For example, the number of zones 81 in a particular region 82-85 may be increased when the marine vessel 10 is traveling in the direction covered by that region 82-85. For example, the zone map 80 depicted in FIG. 4 may be selected when the marine vessel 10 is traveling forward. When the marine vessel 10 is traveling in reverse, a higher concentration of rear zones 81c may be defined (such as four rear zones 81c similar to those depicted in the front region 82), and the number of zones 81a in the front region 82 may decrease (e.g., to one or even zero front zones). Similarly, in a joysticking mode when the marine vessel is traveling laterally sideways, a higher concentration of starboard-side zones 81b or port-side zones 81d may be defined. Accordingly, regions 82-85 may be activated or deactivated based on vessel operation information, such as the direction of travel, vessel speed, gear command or gear state, operation control mode (e.g., joysticking mode, autodocking mode, etc.), steering or throttle inputs from a user or steering/throttle commands from a navigation controller, etc. In such embodiments, the zone map selection may be based on information from the IMUs 36, 62-68, the INS 60, and/or the GPS 40. Likewise, the zone map selection may be based on steering input from a user, such as user inputs received at the joystick 30 or steering wheel 32 to provide steering instructions. Similarly, the zone map 80 may be selected based on a gear position of the transmission 16a, 16b or based on the position of the throttle/shift levers 34.

Further still, the zone map 80 may be selected based on a navigation mode selection, such as upon engagement of an autodocking mode or other autonomous navigation mode or semi-autonomous navigation mode. In autodocking mode, for example, where the marine vessel 10 likely needs to be navigated with high precision and through a high concentration of obstacles, the appropriate zone map 80 may provide an increased number of zones 81 surrounding the marine vessel 10. For example, the zone map 80 depicted in FIG. 3 may be selected, where the zones 81 are equally distributed all the way around the marine vessel 10 and at a relatively high concentration. Thereby, the zone-filtered dataset will have a higher resolution and contain more proximity measurements 90' than if the zone map 80 contained fewer zones 81.

In still other embodiments, the zone map 80 may be selected based on the proximity data itself, such as based on the size and/or location of identified obstacles. For example, if a high concentration of obstacles is detected in a particular area with respect to the marine vessel 10, sensor processor 70 may be configured to increase the concentration of zones in that area in order to increase the resolution. Similarly, if a small or moving object is detected and further clarity on the size and/or location of the obstacle is demanded based on navigation needs, then the number of zones 81 in the area of the identified small or moving object may be increased. Thus, the system may be configured to essentially zoom in on an object by increasing the concentration of zones 81 in the area of that object.

In various embodiments, the total number of zones 81 in a set of zone maps may be fixed or may be variable. For example, the set of zone maps defined for a particular marine vessel 10 may have a predefined number of zones 81, which may be distributed differently in the various zone maps 80. In other embodiments, the zone maps 80 for various vessel operation conditions and/or proximity data situations may have varying numbers of zones 81. For example, the number of zones in the zone map 80 assigned for use during autodocking mode may have a larger number of zones 81 than the zone map 80 assigned for forward travel. Similarly, the zone map 80 assigned for low speed forward travel may have a greater number of zones 81 than that defined for high speed forward travel, where a low concentration of obstacles is expected.

Where a zone map 80 with a greater number of zones is selected, the control system 20 may be configured to adjust network traffic in order to allow for increased bandwidth dedicated to the proximity sensor system. This is applicable in situations where the sensor system communicates on a vessel network with other devices in the control system 20, such as communication on a CAN bus for the marine vessel 10. In certain examples, the selection of the appropriate zone map 80 is configurable as part of the CAN communication algorithm. For example, a navigation controller or other device requesting a proximity dataset, such as from the sensor processor 70, may be configured to send the request with a zone map identifier or other information that can be utilized to identify which zone map should be utilized. The zone-filtered dataset is then generated and returned accordingly. For example, a particular zone map 80 may be selected from a set of stored zone maps based on the direction of movement of the marine vessel, For example, if the control system 20 is operating in joysticking mode to control propulsion based on user input at the joystick 30 to move the marine vessel in the starboard direction, the navigation controller (such as the CCM 24) may request for starboard data to have priority. The sensor processor 70 may then select the appropriate zone map accordingly and use it to filter the proximity measurements to be provided back to the navigation controller.

The zone-based filtering scheme is executed by one or more controllers with the control system 20. Referring again to FIG. 1, the sensor processor 70 receives the proximity measurement from each of the proximity sensors 72-78, and in such an embodiment may be configured with software to perform the zone-based filtering as described herein. Accordingly, the sensor processor 70 may be configured to filter the proximity measurement data and provide the filtered data to a controller performing the navigation, such as the central controller 24. Thus, the sensor processor 70 may be a dedicated, special-purpose computing system configured to process the proximity measurement data from the proximity sensors 72-78. The sensor processor 70 may include its own storage system comprising memory and its own processing system that executes programs and accesses data stored in the memory of the sensor processor 70. For example, the sensor processor 70 may store the set of zone maps for the marine vessel 10, along with one or more software modules comprising computer-executable instructions to perform the zone map selection and zone-based filtering as described herein.

Given the large amount of proximity data produced by the proximity sensors 72-78, the connection between the sensors 72-78 and the sensor processor 70 may be via a dedicated bus or network connection. This dedicated bus or network connection is separate from the vessel network in order to allow transmission of a large amount of proximity measurement data (and, in some embodiments, IMU data) to the sensor processor 70. Such massive data transmission may not be possible on a typical vessel network, such as a CAN bus or wireless network where multiple devices are communicating. The sensor processor 70 may be configured to communicate the filtered data on the vessel network, such as a CAN bus or wireless network, since the zone-filtered dataset is a much smaller and more manageable amount of data. In still other embodiments, a dedicated communication link may be provided between the sensor processor 70 and the navigation controller, such as the central controller 24.

Figure 5:
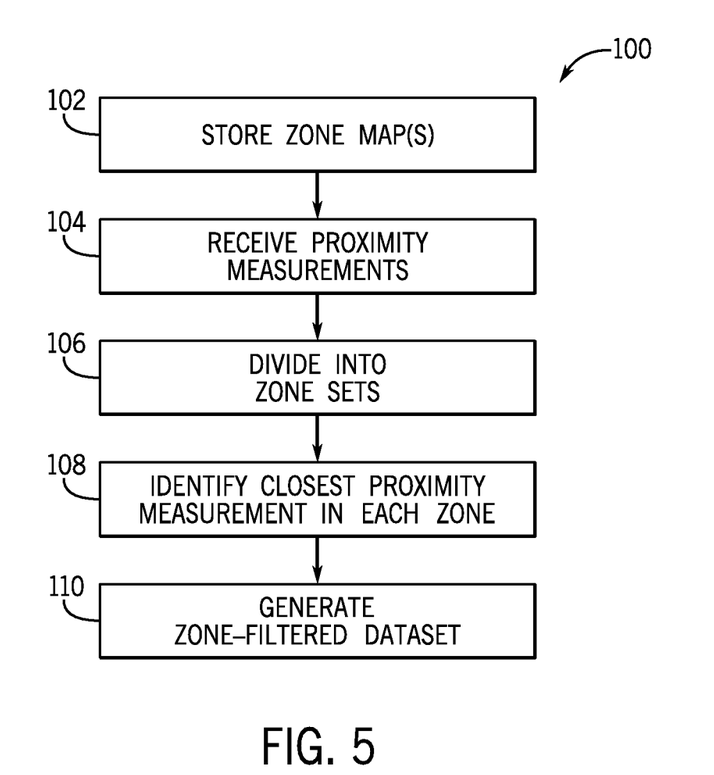
FIGS. 5-7 are flow charts depicting embodiments of methods of proximity sensing according to the present disclosure.
Figure 6:
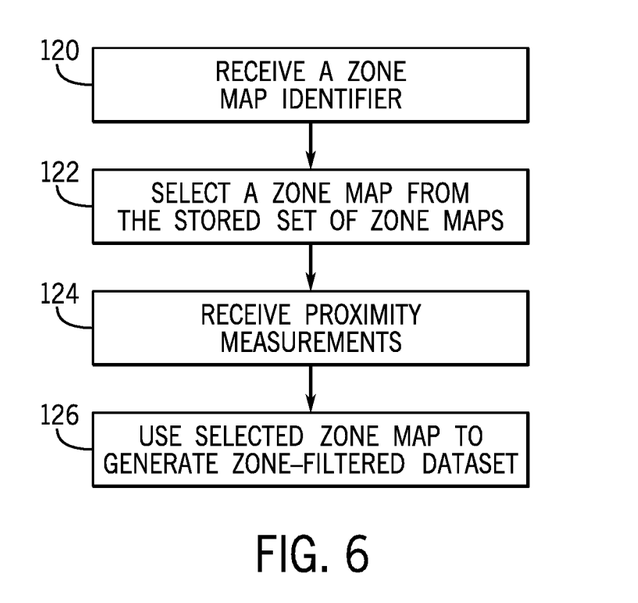
Figure 7:
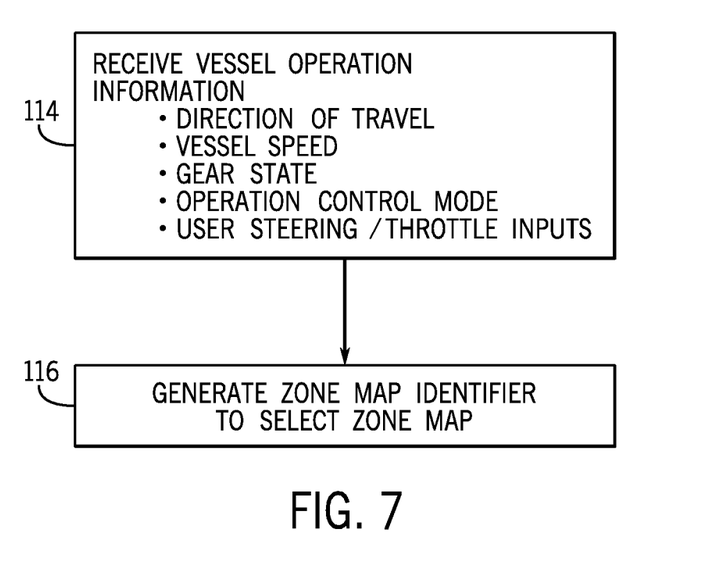

FIGS. 5-7 depict method 100 of proximity sensing on a marine vessel, or portions of such methods. Referring to FIG. 5, one or more zone maps are stored at step 102, which may include a set of zone maps. As described above, the set of zone maps may include different maps to be used for performing a variety control functions and/or environmental or vessel conditions. Proximity measurements are received at step 104 from the one or more proximity sensors on the marine vessel. The proximity measurements are divided in zone sets at step 106 and the closest proximity measurement in each zone is identified at step 108. A zone filtered data set is then generated at step 110 to include the closest proximity measurement from each zone.

In certain embodiments, the sensor processor 70 may be configured to receive a zone map identifier accompanying a request for a proximity measurement data set. As shown in FIG. 6, the sensor processor 70 may be configured to execute steps, including receiving a zone map identifier step 120. The zone map identifier may accompany a request submitted via the CAN bus for proximity information. The sensor processor 70 then selects a zone map from a stored set of zone maps. For example, the set of zone maps may all be defined with respect to a navigation reference point, which is the same navigation reference point to which the proximity measurements are defined. The proximity measurements are then received at step 124 as described above, and the selected zone map is then used to generate the zone-filtered dataset at step 126, as also described above.

FIG. 7 depicts one embodiment of steps that may be executed to make the zone map selection. Current vessel operation information is received or determined at step 114. In various embodiments, the vessel operation information may include one or more of a direction of travel, a vessel speed, a gear state of the transmission or clutch for one or more propulsion devices associated with the marine vessel, an operation control mode (such as a control mode being executed by a navigation controller and/or the CCM 24), a user input to control steering or throttle of the marine vessel, etc. A zone map identifier is then generated at step 116 to select the zone map. In certain examples, the steps of FIG. 7 may be executed by a navigation controller and/or the CCM 24 prior to requested proximity information from the sensor processor 70. Alternatively, the steps depicted at FIG. 7 may be executed by the sensor processor 70. In such an embodiment, the sensor processor 70 may receive a vessel operation information from the CCM 24 and/or other controllers within the system 20. In certain embodiments, the zone map may further be selected based on the proximity measurements, alone or in combination with the vessel operation information. For example, the sensor processor 70 and/or the CCM 24 may be configured to determine whether a threshold amount of proximity measurements or objects are detected within the direction of travel, such as within the region 82-85 of the zone map associated with the current direction of travel of the marine vessel. Where a threshold concentration of objects and/or proximity measurements are concentrated within the area associated with the direction of travel, a zone map may be selected providing an increased number of zone within the relevant region 82-85.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of proximity sensing on a marine vessel for collision avoidance, the method comprising:

storing at least one zone map, wherein the zone map divides an area surrounding the marine vessel into two or more zones defined with respect to a dimension of the marine vessel without regard to geographical location;

receiving proximity measurements in the area surrounding the marine vessel measured by one or more proximity sensors on the marine vessel;

dividing the proximity measurements into zone sets based on a location of each proximity measurement with respect to the zone map, wherein each zone set corresponds with one of the two or more zones defined with respect to the dimension of the marine vessel;

identifying a closest proximity measurement to the marine vessel in each zone set; and generating a zone-filtered dataset containing only the closest proximity measurement in each zone set.

2. The method of claim 1, wherein at least two zone maps are stored and further comprising selecting one of the at least two zone maps prior to dividing the proximity measurements into zone sets.

3. The method of claim 2, wherein the zone map is selected based on current vessel operation information of the marine vessel and/or the proximity measurements.

4. The method of claim 3, wherein vessel operation information includes one or more of a vessel speed of the marine vessel, a direction of travel of the marine vessel, a steering instruction, a navigation mode, or a gear position of a propulsion device.

5. The method of claim 3, and further comprising selecting a different zone map to change a number of zones, a zone size, and/or a zone shape based on a change in the vessel operation information and/or the proximity measurements.

6. The method of claim 5, wherein the different zone map includes an increased number of zones in a direction of travel of the marine vessel.

7. The method of claim 5, further comprising selecting the different zone map based on a steering instruction inputted by a user at one of a steering wheel or a joystick on the marine vessel.

8. The method of claim 5, further comprising detecting a change in navigation mode, and selecting the different zone map to increase or decrease the number of zones based on the navigation mode.

9. The method of claim 1, wherein the zone map divides the area surrounding the marine vessel into equally-sized zones around a navigation reference point.

10. The method of claim 1, wherein the proximity measurements are measured by at least two proximity sensors, each mounted at a different location on the marine vessel and imaging a different section of the area surrounding the marine vessel, wherein the proximity measurements from each of the proximity sensors are translated to a common reference frame.

11. The method of claim 10, wherein the zone map is selected from a set of zone maps, wherein each zone map in the set of zone maps is defined with respect to the common reference frame and calibrated for the marine vessel and specified vessel operation information.

12. The method of claim 10, wherein the at least two proximity sensors include at least two different sensor types and wherein the different imaged sections of the at least two proximity sensors overlap in at least one zone.

13. A proximity sensor system on a marine vessel for collision avoidance, the system comprising:

one or more proximity sensors, each at a sensor location on the marine vessel and configured to measure proximity of objects and generate proximity measurements;

a memory storing at least one zone map, wherein the zone map divides an area surrounding the marine vessel into two or more zones defined with respect to a dimension of the marine vessel without regard to geographical location;

a processor configured to:

receive proximity measurements of one or more objects in the area surrounding the marine vessel measured by the one or more proximity sensors on the marine vessel;

divide the proximity measurements into zone sets based on a location of each proximity measurement with respect to the zone map, wherein each zone set corresponds with one of the two or more zones defined with respect to the dimension of the marine vessel;

identify a closest proximity measurement to the marine vessel in each zone set; and generate a zone-filtered dataset containing only the closest proximity measurement in each zone set.

14. The system of claim 13, wherein the memory stores a set of zone maps wherein each zone map in the set of zone maps is defined with respect to a common reference frame and calibrated for the marine vessel and specified vessel operation information, and wherein the processor is further configured to select the zone map from the set of zone maps prior to dividing the proximity measurements into zone sets.

15. The system of claim 14, wherein the processor is further configured to select the zone map based on a zone map identifier received from a navigation controller.

16. The system of claim 14, wherein at least one of the processor and a navigation controller is further configured to select the zone map based on current vessel operation information of the marine vessel and/or the proximity measurements.

17. The system of claim 16, wherein the vessel operation information includes one or more of a vessel speed of the marine vessel, a direction of travel of the marine vessel, a steering instruction, a navigation mode, or a gear position of a propulsion device.

18. The system of claim 16, wherein the at least one of the processor and the navigation controller is further configured to select a different zone map to change a number of zones, a zone size, and/or a zone shape based on a change in vessel operation information of the marine vessel and/or the proximity measurements.

19. The system of claim 18, wherein the processor is further configured to select the different zone map based on a steering instruction inputted by a user at one of a steering wheel or a joystick on the marine vessel, wherein the different zone map includes an increased number of zones in a direction of travel of the marine vessel.

20. The system of claim 18, wherein the processor is further configured to detect a change in navigation mode, and then select the different zone map to increase or decrease the number of zones based on the navigation mode.

* * * * *